US006610228B2

(12) United States Patent
Capps

(10) Patent No.: US 6,610,228 B2
(45) Date of Patent: Aug. 26, 2003

(54) DRY PROCESS FOR BONDING SILICA-RICH PLANT MATERIALS

(75) Inventor: Charles L. Capps, Little Rock, AR (US)

(73) Assignee: Santee, Inc., Pine Bluff, AR (US)

( * ) Notice: Subject to any disclaimer, the term of this patent is extended or adjusted under 35 U.S.C. 154(b) by 387 days.

(21) Appl. No.: 09/754,448

(22) Filed: Jan. 3, 2001

(65) Prior Publication Data

US 2001/0048173 A1 Dec. 6, 2001

Related U.S. Application Data

(63) Continuation of application No. 09/250,227, filed on Feb. 15, 1999, now abandoned, which is a continuation-in-part of application No. 08/832,101, filed on Apr. 3, 1997, now abandoned, which is a continuation of application No. 08/620,133, filed on Mar. 21, 1996, now abandoned.

(51) Int. Cl.$^7$ .............................. B27N 3/10; B27N 5/00
(52) U.S. Cl. ....................................... 264/109; 264/122
(58) Field of Search ................................. 264/109, 122

(56) References Cited

U.S. PATENT DOCUMENTS

| | | | |
|---|---|---|---|
| 3,747,037 A | 7/1973 | Earing .......................... 336/96 |
| 3,919,173 A | 11/1975 | Coyner et al. .............. 260/77.5 |
| 3,923,926 A | 12/1975 | Harada et al. ......... 260/77.5 AP |
| 4,100,328 A | 7/1978 | Gallagher ................... 428/407 |
| 4,123,412 A | 10/1978 | Fukuda et al. ........ 260/30.8 DS |
| 4,257,995 A | 3/1981 | McLaughlin et al. ........ 264/122 |
| 4,337,710 A | 7/1982 | Haataja et al. ............. 108/53.3 |
| 4,377,646 A | 3/1983 | Blount ........................ 521/154 |
| 4,378,441 A | 3/1983 | Blount ........................ 521/154 |
| 4,427,002 A | 1/1984 | Baron et al. ................... 128/83 |
| 4,525,321 A | 6/1985 | Tonniges .................... 264/517 |
| 4,609,513 A | 9/1986 | Israel .......................... 264/122 |
| 4,692,292 A | 9/1987 | Kollmeier et al. .......... 264/126 |
| 4,692,479 A | 9/1987 | Schneider et al. .......... 523/209 |
| 4,906,484 A | 3/1990 | Lambuth et al. ............ 428/326 |
| 5,008,359 A | 4/1991 | Hunter ....................... 527/103 |
| 5,053,274 A | 10/1991 | Jonas ......................... 428/332 |
| 5,554,330 A | 9/1996 | Flannery et al. ............ 264/113 |

OTHER PUBLICATIONS

Zhengtian et al, "Technology of Rice Straw Particleboard bonded by Urea–Formaldehyde Resin Modified by Isocyanate," Nov. 9–13, 1992, pp 295–302 Pacific Rim Bio Based Composites Symposium.

Zhengtian et al, "Technology of Rice Straw Particleboard bonded by Urea–Formaldehyde Resin Modified by Isocyanate", Nov. 9–13, 1992, pp. 295–302 Pacific Rim Bio-Based Symposium.

*Primary Examiner*—Mary Lynn Theisen
(74) *Attorney, Agent, or Firm*—Locke Liddell & Sapp LLP

(57) ABSTRACT

Particles of silica-rich plant material are bonded into a rigid unitary body. The silica content of such materials is believed to enter into bonding reactions when the materials are combined with a polymeric resin base material such as PAPI that has been previously converted by reaction with a colloidal gel formed from silica and a basic solution. The resulting product exhibits characteristics superior to most engineered wood products. A theoretical analysis of the bonding chemistry is proposed.

13 Claims, No Drawings

DRY PROCESS FOR BONDING SILICA-RICH PLANT MATERIALS

This is a continuation application of co-pending application Ser. No. 09/250,227, filed Feb. 15, 1999 now abandon, which is a continuation-in-part of application Ser. No. 08/832,101 entitled BONDING OF SILICA RICH PLANT PARTICLES, filed Apr. 3, 1997 now abandon, which is a continuation of application Ser. No. 08/620,133, filed Mar. 21, 1996 now abandon.

This invention relates to conversion of cellulosic plant wastes to useful products. More particularly, it relates to methods of binding particles of silica-rich plant materials into a unitary structure and to products produced by such methods.

The manufacture of composition board products (sometimes referred to as engineered wood products) has become widespread and commonplace, primarily as a result of efforts to reduce consumption of exhaustible timber. As trees are harvested and millwork ensues, the residual bark, chips and sawdust are used to create board products for consumer applications. Such millwork reclaimed products serve many consumer needs while reducing consumption of exhaustible trees. These products are known as oriented strand boards, clipboards, particleboards and medium and high density fiberboards and are commonly used for (but not limited to) shelving, furniture, flooring, paneling, cabinets, doors, roofing, underlayment and sheathing construction materials.

Composition wood products are ordinarily formed using resins, ureas, phenols and formaldehyde. Often these products must be further processed with laminations and various structural and cosmetic treatments for consumer use and acceptance. While these manufactured products offer economic and conservation advantages and exhibit several characteristics of solid wood products, they are generally limited in application and are formed using chemical binders with undesirable and adverse environmental and health impacts. Furthermore, most technologies associated with formation of engineered wood products require reduction of wood to usable fiber form; employ wet chemistries; and require high temperatures and high pressures. Thus, they require high energy consumption and raise environmental issues relating to disposal of process wastes and waste water reclamation and clarification.

The presence of high levels of silica in the rice plant is well documented and has limited use of this plant fiber in commercial applications. For example, when burned for cogeneration, high levels of residual build-up may cause physical damage to incineration devices. Silica-rich plant material is slow to decompose, thus creating nutrient depletion of soil and elevated microbial growths which are detrimental to soil. As a feed filler, the silica manifests a degree of hardness and insolubility which interferes with ingestion and digestion. Since there is a reluctance to bond, the individual hulls have been characterized as shifting, thus reducing structural soundness when used as a filler for concrete, asphalt, etc.

In accordance with the present invention, substantially dry particles of silica-rich plant materials are bonded into a unitary product to produce structural material similar to fiber materials and particleboards without use of conventional resins or the like. The term "silica-rich" is used herein to define cellulosic materials of plant origin which comprise approximately eight percent (8%) or more by weight silica Rice hulls and stalks are typical of such silica-rich materials.

The invention includes using a polymeric resin base material preferably comprising 4,4' or 2,4' methylene diisocyanate in the range of from about 20% to about 55% by weight and a functionality greater than about 2. The preferred polymeric resin base material is PAPI or similar diisocyanate containing polymeric by-products obtained as a result of the manufacture of MDI.

This invention also relates to the modification of TDI, MDI, HDI, NDI, and any derivatives thereof. More particularly, it relates to a method of incorporating derivatives of silicon into resin blends including but not limited to any variety of diisocyanates associated with prepolymeric or polymeric materials, polyols, and polyisocyanates to increase adhesive bond strength potential. Additionally, as the silicon content is increased, the modified resin is increasingly tolerant to dilution by water wherein adhesive bond strength potential is extended to produce suitable product for commercial applications at low cost.

The invention includes a method for preparing a binder material for cellulosic products which comprises providing a polymeric resin base material preferably comprising 4,4' or 2,4' methylene diisocyanate in the range of from about 20% to about 55% by weight and a functionality greater than about 2, forming a colloidal gel from silica and a basic solution, and incorporating the colloidal gel into the polymeric base material at a temperature, rate of addition and agitation level to achieve a substantially homogeneous binder material. The preferred polymeric resin base maternal is PAPI or similar diisocyanate containing polymeric by-products obtained as a result of the manufacture of MDI. The colloidal gel is preferably formed by addition of an aqueous solution of an alkali metal hydroxide to solid silica. The amount of colloidal silica incorporated into the polymeric base resin is preferably in the range of from about 40% to about 60% of the molecular weight of the NCO content of the base polymer.

In another aspect, the invention relates to a method for increasing the binding capability and/or stability of diisocyanate containing polymeric resins, some of which have heretofore been considered by-products of no, or limited, utility in the bonding of cellulosic products. By modifying such compositions with silica based materials a new binder material is formed which displays enhanced binding capabilities and stability as compared to the unmodified base resin material. Such new binders can be further diluted with water and used to economically produce bonded cellulosic structures useful in a wide range of applications.

In the preferred embodiment of the invention, a predetermined quantity of silica-rich plant material such as dry rice hulls and/or comminuted rice stalks is weighed and placed in a mixing vessel. No moisture need be added to effect successful binding, the moisture content of the silica-rich plant material itself being sufficient. The term "substantially dry" as used herein refers to silica-rich plant materials that has no additional water added to it, but may contain natural amounts of water ranging up to 10% by weight. The binder material is added to attain a concentration by solids of about 3–20%. However, concentrations higher than 10% appear excessive and sometimes cause subsequent leaching and solidification outside the corpus of the rice hulls. The ingredients are then thoroughly mixed to insure distribution of the base resin material into the dry plant matter. The particle mass is placed in a mold and pre-pressed to form a shape or mat. The pre-pressed shape or mat is then placed in a press preheated to about 250° F. and the press activated to compress the mat for approximately four (4) minutes. The product is then removed and allowed to cool.

The finished product is a board possessing a surface which is smooth, has a coated appearance and beads water.

If trimmed at the edges, the internal structure appears homogeneous and does not chip or flake. Inspection of the product after formation reveals complete bonding of the components. Unlike conventional engineered wood products (even those formed from digested fibers), the product of the invention is non-stratified and homogeneous in consistency throughout the entire body formed. It is extremely difficult to distinguish the individual shape of any initial particle. Intentional fracture of boards formed from rice hulls has demonstrated complete lack of layers of stratification of plant matter.

The following examples are illustrative of the process of the invention used to form board products but the invention is not limited to the particular embodiments described.

EXAMPLE 1

Dry rice hulls, 250 grams, were placed in a blender, 62.5 grams of the converted polymeric base material, in the form of PAPI, (10% by weight solids) were added and mixed for 30 seconds at high speed. The dry mass was then transferred to a frame, leveled, and a metal plate positioned on the surface. Slight pressure was applied by hand, the frame removed, and the mat produced transferred to a Carver press having 6"×6" platens and preheated to 250° F. Pressure of 110 psi was applied and compression and heat maintained for a period of 4 minutes. The pressure was then gradually reduced to avoid abrupt steam release and rupture of the board. Boards produced by this method measured 6"×6"×0.25" and exhibited a lustrous finish on both surfaces.

EXAMPLE 2

The process of Example I was duplicated using 250 grams of dry rice hulls with 65 grams of converted base resin material at 10% solids. Boards produced in this manner resulted in a thickness of 0.50".

EXAMPLE 3

The process and conditions of Example 1 were repeated with the composition at temperature dwell time extended to 8 minutes. The surfaces of the board produced exhibited slight discoloration. In testing the integrity of the board, it was noted that the fiber content had been oxidized or burned. This board exhibited relatively poor strength characteristics.

EXAMPLE 4

500 grams of rice hulls were mixed with 120 grams of converted PAPI at 10% solids. Using the procedures of Example I this mass was formed into a mat measuring 3"×3". Compression was conducted at 100 psi for 5 minutes. The resultant board measured 1.0" in thickness.

EXAMPLES 5–8

Examples 1–4 above were duplicated using a mixture of 75% rice hulls and 25% comminuted rice stalks instead of rice hulls. Examination and physical testing of the resultant boards revealed negligible differences in properties of the products of each respective example.

EXAMPLES 9–12

Examples 1–4 above were duplicated using a mixture of 50% rice hulls and 50% comminuted rice stalks instead of rice hulls. Examination and physical testing of the resultant boards revealed negligible differences in properties of the products of each respective example.

Physical testing (in accordance to ANSI standards) of various aspects of boards produced, as described above, reveals an overall superiority to most engineered wood products. Table I sets forth comparative values for board product of the invention made from, rice hulls and medium density fiberboard of comparable density.

TABLE I

| Characteristic | Product of the Invention | Medium Density Fiberboards |
|---|---|---|
| Modulus of rupture | 4200 psi | 2400 psi |
| Modulus of elasticity | 525,000 | 350,000 |
| Water absorption (as percentage of wt. change) | 4.1 | 7.8 |
| Swelling (percent change) | 1.5 | 3.7 |

In multiple screw holding tests (conducted in compliance with ANSI standards) an average of 710 pounds of exerted pull was found for boards made from rice hulls in accordance with the invention as compared to 325 pounds for wood-based medium density fiberboard. Furthermore, rice hull boards formed under conditions considered to be only 75% of completion of crosslinking exhibited 700 pounds in the screw pull tests.

The starting materials for the method and products of the present invention include a diisocyanate containing base polymer resin. The base resin is normally a fairly viscous material at ambient conditions. It normally comprises a variety of diisocyanates, prepolymers and polymeric materials. The base resins are normally insoluble in water and water cannot be incorporated into the base resins in any substantial amount prior to the modification procedures described herein below. While the base resin material may have some binding capability, that capacity, combined with the inability to dilute the resin with water limits the utility of the base resin. Further, the base resins used herein are relatively unstable and will degrade over time causing relatively short shelf lives. By modifying such base resin materials with silica compounds in accordance with the method of the invention, water can be incorporated into the resins, binding capabilities are enhanced and stability can be controlled.

The modification of the base resin material results in a reduction of the weight % NCO groups present in the base resin. It is thought that the reduction of NCO by hydrolysis in the presence of a salt creates CH and CHO groups which then act to polymerize oligomers, monomers and polymeric isocyanates in the base resin. It is preferred to reduce the NCO content of the base resin materials to a range of from about 4 to about 6% by weight.

In a preferred embodiment of the invention, the base resin has a "functionality" (see comment below regarding definition of this term as it relates to these types of materials) greater than about 2, and a content of 4,4' or 2,4' MDI in the range of from about 20% to 55% by weight in a blend of polymeric materials wherein the balance in polymeric materials is represented as n 3, 4, and 5 in decreasing amounts as 100% solids:

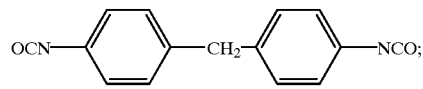

-continued

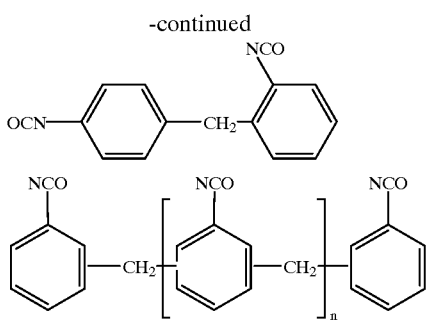

PAPI, ("PAPI" is a trademark of Dow Chemical Company) a commercially available material produced as a by-product during production of MDI, is a particularly preferred base resin material. PAPI 27 is especially preferred and it has a typical molecular weight of about 340, a "Functionality" of 2.7, (Dow indicates in its literature that the term "functionality" as used in connection with PAPI is not true functionality but typifies expected cross-link densities in end use applications) and an isocyanate equivalent weight % of 134.0. The NCO content by weight of PAPI 27 is 31.4; its viscosity at 25° C. is 150–220 cps/mo. It has a vapor pressure of less than $10^{-5}$ (mm Hg at 25° C.) and a density of 1.23 (g/ml) at 25° C. It has been discovered that PAPI can be modified in accordance with the present invention to provide a binder material that has excellent and highly economic benefits in the production of cellulosic based construction materials such as particle board and the like.

PAPI, and other similar base resin materials can be modified in accordance with the method of the present invention to impart desirable properties of strength and storage time. It is known that various soluble forms of the chemical element silicon have polymeric and adhesive properties. Silicon forms positive ion, covalent bonds. Silicon is not allotropic, its diamond structure having an atom surrounded tetrahedrally by four others to which it is covalently bonded. In silicon dioxide, the silicon atom is covalently bonded to four oxygen atoms, the interconnected (by oxygen) tetrahedra thus forming a three dimensional system. This structural propensity is even known to occur in microcrystalline forms of silicon, i.e., when combustion of silane is caused.

Solubilized or hydrated silicon is known as silicic acid. Generally, these acids exist as $H_4SiO_4$ (ortho); $H_2SiO_3$ (meta); or disilicic, trisilicic, etc., acids with a higher degree of hydration. However, quartz and other silica forms react slightly with water to form monosilicic acid as:

$$(SiO_2)n + 2nH_2O \rightarrow nSi(OH)_4$$

This reaction is a depolymerization followed by a hydrolysis. In reverse reaction, the more complex silicic acids are thought to form by polymerization of $Si(OH)_4$ molecules. The chain extension is accomplished by the sharing of —OH ions between two silicon ions (octahedrally coordinated by six hydroxyl ions). Ensuing condensation then follows with the loss of water to produce —Si—O—Si— linkages. This polymerization of a silicic acid results in a stable sol of colloidal particles, or gel. Affection of the silicic acid with acid or alkali catalysts and pH control of the sol establish efficiencies of absorption/dehydration and/or degrees of polymerization. Additionally, as polymerization ensues to produce these linkages, the introduction of cations such as sodium, $Na^+$, potassium, $K^+$, calcium, $Ca^{2+}$, etc., create interstitial bonds, thus causing greater cohesive properties.

Preparation of the slica based colloidal gel material useful in the invention can be effected by addition of a suitable basic solution, including akali metal hydoxide solutions to solid forms of silica. Fumed silica is preferred. In general a pH of from about 8.0 to about 11.5 should be maintained. The resulting colloidal gel can be incorporated into the base resin as discussed below.

It has been discovered that graduated incorporation of silica, for example by careful addition of a colloidal gel, to the diisocyanate containing base resins described above results in a substantially homogeneous binder material of increased binding capapbility and stability. The base resin materials themselves do not mix with or take up water. Too rapid addition of silica containing solutions will not result in a homogeneous binder as the silica phase and the base resin phase will not fully combine. However, by controlling the ratios, parameters and conditions under which the materials are added to one another, a homogeneous binder material can be obtained. In general, the parameters which can be controlled include temperature, rate of addition and shear imparted during the mixing process.

In the preferred method graduated incorporation of the compounds to the diisocyanate blend should be practiced not to exceed 10% per minute of addition of solids to the known content of NCO molecules. For example, a resin blend known to contain 47% MDI has a total % NCO content of 31.3% by molecular weight. Addition of the sodium and silicon solids by molecular weight should not exceed 10% per minute incorporation to the total resin blend. Upon addition of the sodium and silicon solids to a level equivalent 40% to 60% molecular weight of the NCO content, addition of the compounds are terminated.

Mixing of the materials must also be controlled. If too little shear is imparted to the materials as they are combined, the silica gel will not be incorporated into the polymeric resin to form a homogenous material. On the other hand, if too much shear is imparted during combination, clear phase separation can occur. In the experiments run to date, the introduction of the compounds is accompanied by continuous mixing of the polymeric materials preferably at speeds no less than 120 rpm and no greater than 300 rpm. The rpm values are established to achieve a thorough incorporation of the compounds yet avoid breakdown by higher shear when silica gel is utilized. When silica gel is utilized lower speeds are preferred, however, it is noted that rpm values higher than 300 may exist when silicate solutions are incorporated without regard to separation phasing of colloidal gel sols.

Without being bound by any theories, it is believed that an amount of $SiO_2$ exists as silicic anhydride in the silica-rich plant structure. Under normal conditions, this amorphous form is insoluble in water and acids as disclosed by Kiri-Othmer, Encyclopedia of Chemical Technology, vol. 18, (Interscience, New York, 2nd ed., 1969) pp 46–111; and Rochow in Comprehensive Inorganic Chemistry, vol. 1, (Pergamon Press, Oxford, 1973) pp 1388–1402. However, it is believed that the open end hydroxyls associated with cellulosic fibers and in the water contained in the plant material are sufficiently in abundance to retain $SiO_2$ within the plant system and that this exists as an association of multiple water groups as represented by:

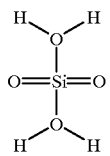

It is believed that several phenomena occur to result in a complex and crosslinked bonding of plant materials high in silica levels. For example, it is believed that diisocyanates, (such as 4,4' methylene diphenyl diisocyanate or 2,4' methylene diphenyl diisocyanate) are catalyzed by the presence of the silicic anhydride which has been converted to silicic acid by association with water molecules. This reaction may be represented as:

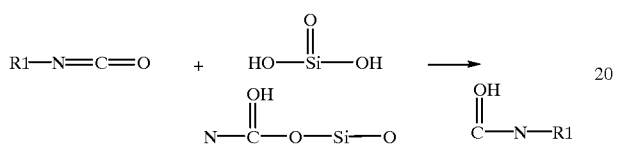

Since the above catalysis occurs in the presence of cellulosic fibers high in open end hydroxyls, it is believed that a reaction occurs which may be represented as:

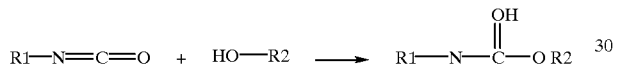

wherein
R1 is one half of a diisocyanate compound and
R2 is cellulose.

These reactions are believed to result in formation of a backbone created by hydrated amorphous silica wherein the resultant acid catalyzes the polymeric resin base material with linking occurring at open end hydroxyls and the diisocyanate then linking to the cellulosic content.

Diisocyanates are known to be cyclic crosslinking compounds with methyl groups. It is believed that the reaction thus forms an organosilicon hydroxide polymer complex with extensive bonding occurring at OH, O and C sites. It is further believed the reaction is caused by acid catalysis of the polymeric resin base material, thus initiating a chain reaction with $SiO_2$ molecules in situ with cellulose to form bonds of a superior nature.

Additionally, it is known that vicinal hydrogen bonding occurs among cellulosic fibers as well as Van der Waals effects to promote cellulosic bonding. It is believed that these multiple associations and bondings serve to create strength and integrity of the product formed. Accordingly, it should be noted that the present invention would produce similar results with any plant structure containing about 8% or more $SiO_2$.

The invention has particular applicability in forming wood replacement products for consumer use without relying on exhaustible timber. Rice hulls and stalks are a by-product of an annual harvest of grain; have little commercial use; are considered a nuisance waste; and are of low economic value. Since the economic value of this plant matter is minimal, invention represents the ability to provide consumer products at lower production costs (based on existing equipment used in forming wood products). Additionally, manufacturing capital investment is reduced by elimination of fiber digesting equipment; elimination of water treatment for environmental reasons; and elimination of air quality control devices required when formaldehyde based resins are used.

It will readily recognize that the invention is not limited to formation of board products. Instead, the appropriate mixture of components can be formed in any suitable mold shape to form shaped bodies. Furthermore, the mixture can also be heated and formed into a unitary body by extrusion and the like.

While the invention has been described with particular reference to specific embodiments thereof, it is to be understood that the forms of the invention shown and described in detail are to be taken as preferred embodiments thereof. Various changes and modifications may be resorted to without departing from the spirit and scope of the invention as defined by the appended claims.

What is claimed:

1. A method forming a rigid structural body comprising the steps of:
   providing a polymeric resin base material comprising 4,4' or 2,4' methylene diisocyanate;
   forming a colloidal gel formed from silica and a basic solution;
   forming a binder material by incorporating the colloidal gel into said polymeric base material;
   forming a composition from a substantially dry mixture of silica-rich plant material and said binder material;
   heating said composition; and
   compressing said composition.

2. A method as set forth in claim 1 wherein said composition of silica-rich plant material contains comminuted rice stalks.

3. A method as set forth in claim 1 wherein said composition contains rice hulls.

4. A method as set forth in claim 1 wherein said polymeric resin base material is PAPI.

5. A method as set forth in claim 1 wherein said compressing and said heating occur substantially simultaneously.

6. A method as set forth in claim 5 wherein said composition is compressed at about 105 psi to about 110 psi while heated to a temperature of about 250° F.

7. A method as set forth in claim 6 wherein said heating and said compressing are maintained for a period of about four (4) to about six (6) minutes.

8. The method of claim 1 wherein said colloidal gel is formed by addition of an aqueous solution of an alkali metal hydroxide to solid silica.

9. The method of claim 1 wherein said colloidal gel is incorporated into said polymeric base material at a temperature, rate of addition and agitation level to achieve a substantially homogeneous binder material.

10. The method of claim 1 wherein said binder material is added in an amount such that the solids content thereof comprises from about 3% to about 20% by weight of said composition.

11. The method of claim 9 wherein said colloidal gel is incorporated into said polymeric base material at a rate of addition of 10% per minute addition of solids to the content of NCO molecules in said polymeric resin base material.

12. The method of claim 1 wherein said colloidal gel is formed at a pH of about 8.0 to 11.5.

13. The method of claim 1 wherein said colloidal gel is formed by continuous mixing at speeds of no more than from about 120 to about 300 rpm.

* * * * *